United States Patent
Panitz et al.

(10) Patent No.: US 8,945,778 B2
(45) Date of Patent: Feb. 3, 2015

(54) CONDUCTING SALTS FOR GALVANIC CELLS, THE PRODUCTION THEREOF AND THEIR USE

(75) Inventors: Jan-Christoph Panitz, Frankfurt (DE); Andreas Pötschke, Kahl (DE); Rainer Dietz, Egesbach (DE); Ulrich Wietelmann, Friedrichsdorf (DE)

(73) Assignee: Chemetall GmbH, Frankfurt am Main (DE)

(*) Notice: Subject to any disclaimer, the term of this patent is extended or adjusted under 35 U.S.C. 154(b) by 1853 days.

(21) Appl. No.: 10/591,509

(22) PCT Filed: Mar. 8, 2005

(86) PCT No.: PCT/EP2005/002439
§ 371 (c)(1),
(2), (4) Date: Aug. 14, 2007

(87) PCT Pub. No.: WO2005/086274
PCT Pub. Date: Sep. 15, 2005

(65) Prior Publication Data
US 2007/0269715 A1    Nov. 22, 2007

(30) Foreign Application Priority Data
Mar. 8, 2004    (DE) .......................... 10 2004 011 522

(51) Int. Cl.
*H01M 10/0562*    (2010.01)
*H01M 6/04*    (2006.01)
*H01M 10/0568*    (2010.01)

(52) U.S. Cl.
CPC .... H01M 10/0568 (2013.01); *H01M 2300/002* (2013.01)
USPC ............................. 429/322; 429/321; 429/188

(58) Field of Classification Search
CPC ................................................ H01M 10/0568
USPC ........................................... 429/322, 321, 188
See application file for complete search history.

(56) References Cited

U.S. PATENT DOCUMENTS

| 6,183,907 B1 | 2/2001 | Barusseau et al. |
| 6,548,212 B1 | 4/2003 | Heider et al. |
| 7,709,663 B2 | 5/2010 | Wietelmann et al. |
| 2006/0240322 A1* | 10/2006 | Xu et al. ...................... 429/188 |

FOREIGN PATENT DOCUMENTS

| CA | 2 324 630 | 4/2001 |
| DE | 198 29 030 C1 | 10/1999 |
| DE | 10108592 | 8/2002 |
| EP | 0907214 | 4/1999 |
| EP | 1035612 | 9/2000 |
| EP | 1095942 | 5/2001 |
| WO | WO 01/99209 | 12/2001 |

OTHER PUBLICATIONS

Xu, et al. : "LiBOB and Its Derivatives [..]", *Elechtrochem. Solid-State Let.* 4 (1) (2001), pp. E1-E4.

* cited by examiner

*Primary Examiner* — Helen O Conley
(74) *Attorney, Agent, or Firm* — James R. Crawford; Fulbright & Jaworski LLP

(57) ABSTRACT

The invention relates to conducting salts which contain lithium bis(oxalato)borate (LiBOB) and mixed lithium borate salts of the type of formula (I), wherein the portion of compound (I) in the conducting salt is 0.01 to 20 mole-% and X in formula (I) is a bridge linked with the boron via two oxygen atoms, selected from formula (II), wherein $Y^1$ and $Y^2$ together=O, m=1, n=0 and $Y^3$ and $Y^4$ independently represent H or an alkyl group with 1 to 5 C atoms, or $Y^1$, $Y^2$, $Y^3$, $Y^4$ independently represent OR (with R=alkyl group with to 5 C atoms), or H or an alkyl group with 1 to 5 C atoms, and wherein m=0 or 1, n=0 or 1, or $Y^2$ and $Y^3$ are members of a 5- or 6-membered aromatic or heteroaromatic ring (with N, O or S as the hetero element) which can be optionally substituted with alkyl, alkoxy, carboxy or nitrile, and if so, $Y^1$ and $Y^4$ are not applicable and n>0, m=0 or 1. The invention also relates to a method for producing the inventive conducting salts.
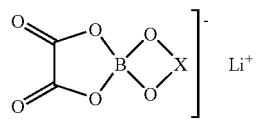
(I)
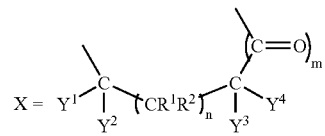
(II)
15 Claims, 1 Drawing Sheet

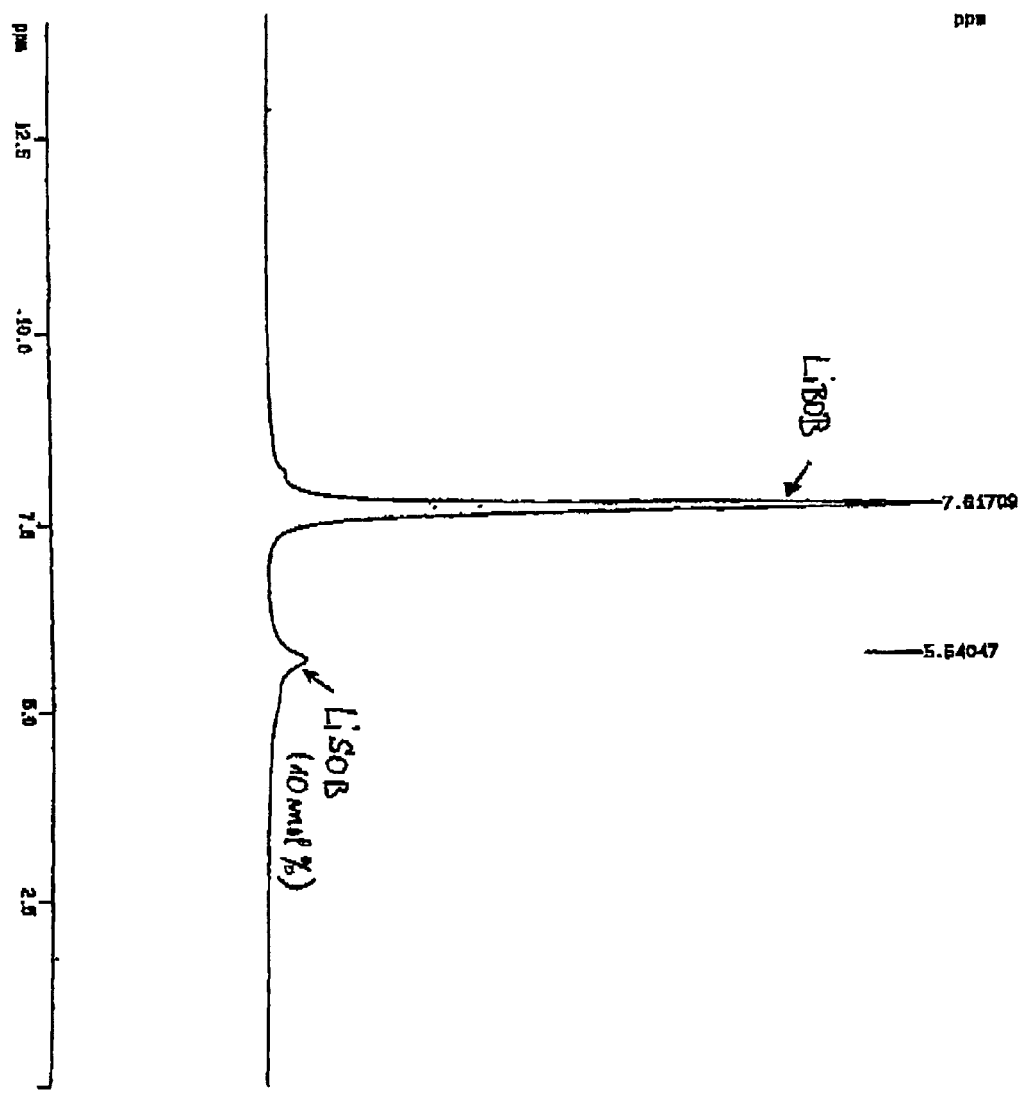

CONDUCTING SALTS FOR GALVANIC CELLS, THE PRODUCTION THEREOF AND THEIR USE

This is a §371 of PCT/EP2005/002439 filed Mar. 8, 2005, which claims priority from German Patent Application No. 10 2004 011 522.2 filed Mar. 8, 2004.

The invention relates to lithium-borate complex salts, to the production thereof and to the use thereof as electrolytes in galvanic cells, in particular as conducting salts in lithium-ion batteries.

Mobile electronic appliances require ever more efficient rechargeable batteries for their independent power supply. Suitable for this purpose, besides nickel/cadmium and nickel/metal-hydride accumulator batteries, are rechargeable lithium batteries, which in comparison with the nickel batteries have a significantly higher energy density. The conventional systems on the market have a terminal voltage of about 3 V; the consequence of this potential is that water-based electrolyte systems cannot be used in lithium batteries. Instead, non-aqueous, mostly organic electrolytes (i.e. solutions of a lithium salt in organic solvents such as carbonates, ethers or esters) find application in liquid systems.

In the battery design that is dominant at the present time—lithium-ion batteries with liquid electrolytes—lithium hexafluorophosphate ($LiPF_6$) is used practically exclusively as conducting salt. This salt possesses the necessary prerequisites for use in high-energy cells—i.e. it is readily soluble in aprotic solvents, it results in electrolytes having high conductivities, and it exhibits a high degree of electrochemical stability. Oxidative decomposition occurs only at potentials >approx. 4.5 V. However, $LiPF_6$ has serious disadvantages, which can mainly be attributed to its lack of thermal stability (decomposition above approx. 130° C.). In addition, corroding and toxic hydrogen fluoride is released in the event of contact with moisture, which, on the one hand, makes handling difficult and, on the other hand, attacks and damages integral parts of the battery, e.g. the cathode.

Against this background, intense efforts are being made to develop alternative conducting salts. Above all, lithium salts with perfluorinated organic residues have been tested as such. In this connection it is a question of lithium trifluoromethanesulfonate ('Li triflate'), lithium imides (lithium bis(perfluoralkylsulfonyl)imides) and also lithium methides (lithium tris(perfluoralkylsulfonyl)methides). All these salts require relatively elaborate production processes, are therefore relatively expensive, and have other drawbacks, such as corrosivity with respect to aluminium, or poor conductivity.

Lithium organoborates have been investigated as a further class of compounds for use as conducting salt in rechargeable lithium batteries. However, on account of their low oxidative stability and on account of misgivings as regards safety in connection with the handling of triorganoboranes, they do not come into consideration for commercial systems.

A significant advance is represented by the lithium complex salts of the type $ABL_2$ (where A signifies lithium or a quaternary ammonium ion, B signifies boron, and L signifies a bidentate ligand which is bound to the boron atom via oxygen atoms) which are proposed in EP 698 301 for use in galvanic cells. However, the proposed salts, the ligands of which contain at least one aromatic residue, exhibit sufficient electrochemical stability only when the aromatic hydrocarbon is substituted with electron-attracting residues, typically fluorine, or exhibits at least one nitrogen atom in the ring. Such chelate compounds are not commercially available and can only be produced with high costs. The proposed products have therefore been unable to gain acceptance on the market.

Quite similar boron compounds are proposed in EP 907 217 as constituents in organic electrolyte cells. By way of boron-containing conducting salt, compounds of the general formula LiBXX' are proposed, wherein the ligands X and X' may be the same or different and each ligand contains an electron-attracting group containing oxygen, which binds to the boron atom. However, the listed compounds (lithium boron disalicylate and a special imide salt) exhibit the disadvantages already mentioned above.

The lithium bis(oxalato)borate (LiBOB) described for the first time in DE 198 29 030 is the first boron-centred complex salt described for use as an electrolyte that uses a dicarboxylic acid (in this case, oxalic acid) as chelate component. The compound is easy to produce, is non-toxic, and is electrochemically stable up to about 4.5 V, which makes its use in lithium-ion batteries possible. A disadvantageous aspect, however, is the fact that it can hardly be employed in new battery systems with cell voltages>3 V. For electrochemical storage batteries of such a type, salts having stabilities ≥approx. 5 V are required. A further disadvantageous aspect is the fact that lithium bis(oxalato)borate does not admit of any possibilities for structural variation without the basic framework being destroyed.

In EP 1 035 612 additives of the formula

are named,
with m and p=0, 1, 2, 3 or 4, where m+p=4, and
$R^1$ and $R^2$ are the same or different and are optionally linked to one another directly by a single or double bond,
in each case, individually or jointly, have the significance of an aromatic or aliphatic carboxylic or sulfonic acid, or
in each case, individually or jointly, have the significance of an aromatic ring from the group comprising phenyl, naphthyl, anthracenyl or phenanthrenyl, which may be unsubstituted or monosubstituted to tetrasubstituted by A or Hal, or
in each case, individually or jointly, have the significance of a heterocyclic aromatic ring from the group comprising pyridyl, pyrazyl or bipyridyl, which may be unsubstituted or monosubstituted to trisubstituted by A or Hal, or in each case, individually or jointly, have the significance of an aromatic hydroxy acid from the group of aromatic hydroxycarboxylic acids or of aromatic hydroxysulfonic acids, which may be unsubstituted or monosubstituted to tetrasubstituted by A or Hal, and
Hal=F, Cl or Br, and
A=alkyl residue with 1 to 6 C atoms, which may be monohalogenated to trihalogenated.

To be mentioned as particularly preferred additives are lithium bis[1,2-benzenediolato(2-)O,O']borate(1-), lithium bis[3-fluoro-1,2-benzenediolato(2-)O,O']borate(1-), lithium bis[2,3-naphthalenediolato(2-)O,O']borate(1-), lithium bis[2,2-biphenyldiolato(2-)O,O']borate(1-), lithium bis[salicylato(2-)O,O']borate(1-), lithium bis[2-olato-benzenesulfonato(2-)O,O']borate(1-), lithium bis[5-fluoro-2-olato-benzenesulfonato(2-)O,O']borate(1-), lithium phenolate and lithium-2,2-biphenolate. These are all symmetrical lithium chelatoborates of the Li[BL2] type.

Lithium bis(malonato)borate, which is supposed to exhibit an electrochemical window of up to 5 V, has been described by C. Angell as an electrochemically particularly stable, simple lithium (chelato)borate compound. The compound considered has the disadvantage that it is practically insoluble in the conventional battery solvents (e.g. only 0.08 molar in propylene carbonate), so that it can be dissolved and characterised only in DMSO and similar solvents that are prohibitive for batteries (Wu Xu and C. Austen Angell, Electrochem. Solid-State Lett. 4, E1-E4, 2001).

In DE 101 08 592 mixed boron chelate complexes of the general formula

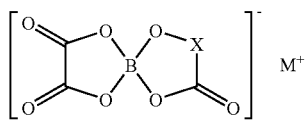

are described, with
either X=—C(R$^1$R$^2$)— or —C(R$^1$R$^2$)—C(=O)—, wherein R$^1$, R=independently of one another, H, alkyl (with 1 to 5 C atoms), aryl, silyl or a polymer, and one of the alkyl residues R$^1$ or R$^2$ may be linked to a further chelatoborate residue,
or X=1,2-aryl, with up to 2 substituents S in positions 3 to 6

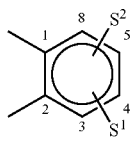

wherein S$^1$, S$^2$=independently of one another, alkyl (with 1 to 5 C atoms), fluorine or polymer,
and M+=Li$^+$, Na$^+$, K$^+$, Rb$^+$, Cs$^+$ or [(R$^3$R$^4$R$^5$R$^6$)N]$^+$ or H$^+$, with R$^3$, R$^4$, R$^5$, R$^6$=independently of one another, H or alkyl with preferably 1 to 4 C atoms.

A disadvantageous aspect of these compounds is their frequently unsatisfactory solubility in organic solvents such as propylene carbonate, for example. Therefore the electrical conductivity of such solutions is, as a rule, lower than that of established lithium salts (such as LiPF$_6$ or LiBOB, for example).

For this reason, liquid electrolytes that exclusively contain one of the mixed boron chelate complex salts disclosed in DE 101 08 592 cannot be employed for powerful high-performance batteries.

The synthesis as described in DE 101 08 592 and in DE 101 08 608 is also not free from disadvantages: in the course of the production of mixed salts—starting from an oxidic boron raw material, for example boric acid or boron oxide, and two differing complex ligands L$^1$ and L$^2$ in a molar ratio of 1:1:1—not only does the desired mixed complex salt arise but also the homo compounds [BL$^1_2$]$^-$ and [BL$^2_2$]$^-$. In DE 101 08 608 the following examples are mentioned:

The undesirable homo compounds have varying physicochemical properties, especially an electrochemical stability differing from that of the mixed compound; therefore they have to be separated out by recrystallisation or by a similar purification process, which is relatively costly.

WO 01/99209 also discloses the production of mixed lithium-borate salts such as lithium (malonato oxalato)borate (Examples 6 and 7). Two possibilities for synthesis are described, which both yield the desired salt as main product, but contaminations by homo complex compounds cannot be avoided (Example 6: 4.5% lithium bis(oxalato)borate).

In EP 1 095 942 complex salts of the formula

are described (with respect to the significance of R$^1$, R$^2$, m and p, see above in connection with EP 1 035 612). They serve as conducting salts in electrolytes for electrochemical cells. They may also be used in proportions between 1% and 99% in combination with other conducting salts. Suitable are conducting salts from the group comprising LiPF$_6$, LiBF$_4$, LiClO$_4$, LiAsF$_6$, LiCF$_3$SO$_3$, LiN(CF$_3$SO$_2$)$_2$ or LiC(CF$_3$SO$_2$)$_3$ and mixtures thereof. These are all fluorinated conducting salts.

The object of the present invention is to overcome the disadvantages of the state of the art and to find, in particular, fluorine-free conducting salts that are capable of being produced easily and inexpensively for lithium-ion batteries, and to demonstrate the synthesis thereof. Moreover, the conducting salts are to be capable of being adapted to the material-specific and application-specific properties and are to have a forming function and an overcharge-protection function.

The object is achieved in that salt mixtures containing lithium bis(oxalato)borate ('LiBOB') and also mixed lithium-borate salts of the type

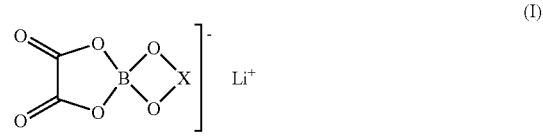

(I)

are employed by way of conducting salt, the proportion of compound (I) in the salt mixture amounting to 0.01 mol. % to 20 mol. %. X in formula (I) is a bridge which is linked to the boron by two oxygen atoms and which is selected from

| Parent substance | | Boron compound | Molar ratio | Proportion of complex salts acc. to $^{11}$B NMR | | | Example from DE 10108608 |
|---|---|---|---|---|---|---|---|
| L$_1$ | L$_2$ | | | [BL$^1$L$^2$]$^-$ | [BL$^1_2$]$^-$ | [BL$^2_2$]$^-$ | |
| oxalic acid | malonic acid | boric acid | 1:1:1 | 71% | 11% | 17% | 5 |
| oxalic acid | lactic acid | boric acid | 1:1:1 | 95% | 2% | 3% | 6 |
| oxalic acid | salicylic acid | boric acid | 1:1:1 | 77% | 10% | 13% | 2* |

*DE 101 08 592

X = 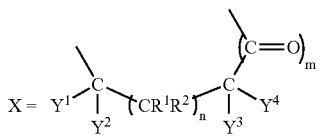

wherein
R¹ and R² are independently of one another, H, alkyl (with 1 to 5 C atoms), aryl, silyl or a polymer, and one of the alkyl residues R¹ and R² may be linked to a further chelatoborate residue, Y¹ and Y² together signify O, m=1, n=0, and Y³ and Y⁴ are, independently of one another, H or an alkyl residue with 1 to 5 C atoms, or Y¹, Y², Y³, Y¹ are in each case, independently of one another, OR (with R=alkyl residue with 1 to 5 C atoms) or H or an alkyl residue with 1 to 5 C atoms, and where m=0 or 1, n=0 or 1, or Y² and Y³ are members of a 5-membered or 6-membered aromatic or heteroaromatic ring (with N, O or S as heteroelement) which may be optionally substituted with alkyl, alkoxy, carboxy or nitrile, in which case Y¹ and Y⁴ are not applicable and n=0, m=0 or 1.

These new, fluorine-free mixtures of substances may, for example, be produced in a manner analogous to a production process described in DE 101 08 592. In this process, the 1:1:1:1 stoichiometry (boron compound (e.g. boric acid)/oxalic acid/chelating agent $L^2$/lithium compound) has to be departed from in such a manner that at most 20 mol. % of the chelating agent $L^2$, relative to oxalic acid, is employed. The molar ratio of the substances employed (boron compound/mixture of oxalic acid and chelating agent $L^2$/lithium compound) is 1:2:1, the mixture of oxalic acid and chelating agent $L^2$ containing a maximum of 20 mol. % chelating agent $L^2$. In this case $L^2$ is, for example, a dicarboxylic acid (not oxalic acid), hydroxycarboxylic acid or salicylic acid (which may also be maximally disubstituted). Further possibilities for the chelating agent L2 are listed below in connection with the description of compound part X.

The conversion is preferably undertaken in such a manner that the raw-material components are suspended in a medium (e.g. toluene, xylene, methylcyclohexane, perfluorinated hydrocarbons with more than 6 C atoms) that is suitable for azeotropic removal of water, and the water is removed azeotropically in known manner.

It is also possible to perform the synthesis in aqueous solution. In this case the components are charged into water in arbitrary sequence and are concentrated by evaporation, subject to stirring, preferably at reduced pressure. After removal of the bulk of the water, a solid reaction product forms which, depending upon the specific product properties, is subjected to final drying at temperatures between 100° C. and 180° C. and at reduced pressure (e.g. 10 mbar). Besides water, alcohols and other polar organic solvents are also suitable as reaction media.

Lastly, production of the product may also be undertaken without addition of any solvent, i.e. the commercial raw materials are mixed and are then heated by supply of heat, and are dehydrated, under preferably reduced pressure.

In the course of implementation of the process a mixture forms that contains at least 80 nmol. % LiBOB in addition to at most 20 mol. % of the mixed lithium-borate salt (I). Surprisingly, no detectable quantities of the homo complex compound

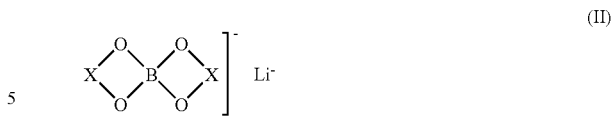

are present in synthesis mixtures of such a type. The conducting-salt mixture that is obtained has the advantage, in comparison with pure LiBOB, that in the event of overcharge a decomposition reaction sets in at the cathode, which slows down the rise in cell voltage.

As a result, dangerous consequent reactions of the cathode material with constituents of the electrolyte can be avoided or lessened.

Preferred examples of compound part X are 1,3-dicarboxylic acids formally lessened by two OH groups, such as malonic acid and alkylmalonic acids (malonic acid substituted with an alkyl group with preferably 1 to 5 C atoms). (The O atoms binding to the boron are already contained in formula (I); the 1,3-dicarboxylic acids correspond to $L^2$.)

Further preferred examples of compound part X are 1,2- or 1,3-hydroxycarboxylic acids formally lessened by two OH groups, such as glycolic acid or lactic acid. (The 1,2- or 1,3-hydroxycarboxylic acids correspond to $L^2$.) Compound part X may also preferably be constituted by saturated $C_2$ chains or saturated $C_3$ chains, this being derivable formally from 1,2- or 1,3-diols lessened by two OH groups. (The 1,2- or 1,3-diols correspond to $L^2$.)

Further preferred examples of compound part X are 1,2-bisphenols, (such as pyrocatechol) or 1,2-carboxyphenols (such as salicylic acid) or aromatic or heteroaromatic 1,2-dicarboxylic acids (such as phthalic acid or pyridine-2,3-diol), these compounds having been formally lessened by two OH groups. The listed 1,2-bisphenols, 1,2-carboxyphenols or aromatic 1,2-dicarboxylic acids correspond to $L^2$.

The subject-matter of the invention will be elucidated in more detail on the basis of the following Examples:

EXAMPLE 1

In a 250 ml round-bottom flask made of glass 23.95 g oxalic acid dehydrate, 6.81 g boric acid and 1.38 g salicylic acid (10 mol. %, relative to boric acid) were suspended in 50 ml water and, subject to stirring, added to 4.06 g lithium carbonate. After the evolution of gas ($CO_2$ from the neutralisation reaction) had flattened out, the suspension was refluxed for 1 hour at an oil-bath temperature of 115° C. In this process a clear, colourless solution was formed. This solution was totally concentrated by evaporation in a vacuum in a rotary evaporator at an oil-bath temperature of 125° C.

The solids left behind were precrushed with a nickel spatula under protective-gas atmosphere (argon) and were finely triturated in a porcelain mortar. The powder was then recharged into a glass round-bottom flask and subjected to final drying in a rotary evaporator at 150° C. and, lastly, at 13 mbar.

Yield: 17.3 g (88% of the theoretical value; losses due to baked-on deposits in the glass flask)

Analysis: lithium 3.60% (nominal: 3.54%)

Purity: In the $^{11}B$ NMR spectrum (solvent $THF/C_6D_6$) it is not possible for the homo compound lithium bis(salicylato) borate (literature shift 4.0 ppm) to be detected; recognisable only are the signals of the expected products lithium bis (oxalato)borate (7.6 ppm), abbreviated to LiBOB, and of the mixed salt lithium (salicylato, oxalato)borate (5.6 ppm), abbreviated to LiSOB, see FIG. 1.

The invention claimed is:

1. A conducting salt comprising lithium bis(oxalato) borate (LiBOB) and a mixed lithium-borate salt of formula (I)

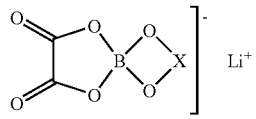

(I)

wherein the conducting salt is fluorine free;
wherein the proportion of the mixed lithium-borate salt of formula (I) in the conducting salt ranges from 0.01 mol. % to 20 mol. %, and
wherein

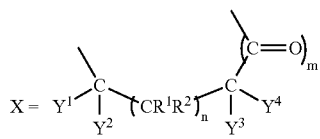

wherein
$R^1$ and $R^2$ are, independently of one another, H, alkyl having 1 to 5 C atoms, aryl, silyl or a polymer, and wherein if at least one of $R^1$ or $R^2$ are alkyl, said alkyl may be linked to a further chelatoborate residue,
$Y^1$ and $Y^2$ together are a single oxygen atom, m=1, n=0, and wherein $Y^3$ and $Y^4$ are, independently of one another, H or an alkyl residue with 1 to 5 C atoms, or wherein
$Y^1$, $Y^2$, $Y^3$, $Y^4$ are, in each case, independently of one another, OR, wherein R is an alkyl residue with 1 to 5 C atoms, H or an alkyl residue with 1 to 5 C atoms, and where m=0 or 1, n=0 or 1, or wherein
$Y^2$ and $Y^3$ are members of a 5-membered or 6-membered aromatic or heteroaromatic ring containing at least one of N, O or S, wherein $Y^1$ and $Y^4$ are not applicable and n=0, m=0 or 1.

2. A conducting salt according to claim 1, wherein X is formed from 1,3-dicarboxylic acids formally lessened by two OH groups.

3. A conducting salt according to claim 2, wherein the 1,3-dicarboxylic acid is malonic acid or an alkylmalonic acid.

4. A conducting salt according to claim 2, wherein X is formed from 1,2-hydroxycarboxylic acid or 1,3-hydroxycarboxylic acid formally lessened by two OH groups.

5. A conducting salt according to claim 4, wherein the 1,2-hydroxycarbcxylic acid or 1,3-hydroxycarboxylic acid is glycolic acid or lactic acid.

6. A conducting salt according to claim 1, wherein X is formed by saturated $C^2$ chains or saturated $C^3$ chains.

7. A conducting salt according to claim 1, wherein X is formed from a 1,2-bisphenol, a 1,2-carboxyphenol, an aromatic 1,2-dicarboxylic acid or pyridine-2,3-diol that have been formally lessened by two OH groups.

8. A conducting salt according to claim 7, wherein the 1,2-bisphenol is pyrocatechol, the 1,2-carboxyphenol is salicylic acid, and the 1,2-dicarboxylic acid is phthalic acid.

9. A process for producing a conducting salt, wherein the conducting salt comprises lithium bis(oxalato)borate and a mixed lithium-borate salt of formula (I)

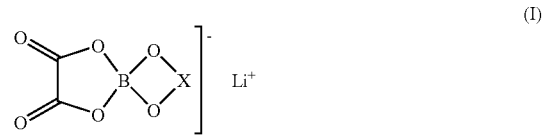

(I)

wherein the conducting salt is fluorine free;
wherein the proportion of the mixed lithium-borate salt of formula (I) in the conducting salt ranges from 0.01 mol. % to 20 mol. %, and

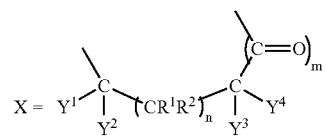

wherein
$R^1$ and $R^2$ are, independently of one another, H, alkyl having 1 to 5 C atoms, aryl, silyl or a polymer, and wherein if at least one of $R^1$ or $R^2$ are alkyl, said alkyl may be linked to a further chelatoborate residue,
$Y^1$ and $Y^2$ together are a single oxygen atom, m=1, n=0, and wherein $Y^3$ and $Y^4$ are, independently of one another, H or an alkyl residue with 1 to 5 C atoms, or wherein
$Y^1$, $Y^2$, $Y^3$, $Y^4$ are, in each case, independently of one another, OR, wherein R is an alkyl residue with 1 to 5 C atoms, H or an alkyl residue with 1 to 5 C atoms, and where m=0 or 1, n=0 or 1, or wherein
$Y^2$ and $Y^3$ are members of a 5-membered or 6-membered aromatic or heteroaromatic ring containing at least one of N, O or S, wherein $Y^1$ and $Y^4$ are not applicable and n=0, m=0 or 1, comprising mixing a boron compound, oxalic acid and a chelating agent $L^2$ and a lithium compound in a molar ratio of of 1:2:1, wherein the mixture of oxalic acid and chelating agent $L^2$ contains a maximum of 20 mol. % chelating agent $L^2$.

10. The process according to claim 9, wherein boric acid is the boron compound, chelating agent $L^2$ a dicarboxylic acid that is not oxalic acid or hydroxycarboxylic acid.

11. The process according to claim 9, wherein chelating agent $L^2$ is selected from the group consisting of a 1,3-dicarboxylic acid in which an alkyl group with 1 to 5 C atoms a 1,2-hydroxycarboxylic acid, a 1,3-hydroxycarboxylic acid, a 1,2-diol, a 1,3-diol, a 1,2-bisphenol, a 1,2-carboxyphenol, an aromatic 1,2-dicarboxylic acid and a heteroaromatic 1,2-dicarboxylic acid.

12. The process according to claim 9, wherein the boron compound mixture is mixed without addition of a solvent, are heated by supply of heat and are dehydrated under preferably reduced pressure.

13. A galvanic cell comprising a cell and the conducting salt according to claim 1.

14. A lithium-ion battery comprising a conducting salt according to claim 1.

15. A conducting salt comprising lithium bis(oxalato)borate (LiBOB) and a mixed lithium-borate salt of formula (I):

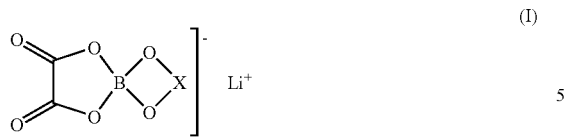 (I)

wherein the conducting salt is fluorine free;
wherein the proportion of compound (I) in the conducting salt ranges from 0.01 mol. % to 20 mol. % and

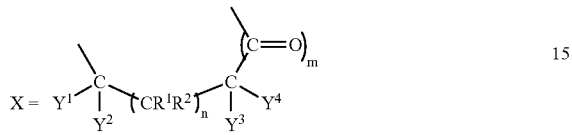

wherein
$R^1$ and $R^2$ are, independently of one another, H, alkyl having 1 to 5 C atoms, aryl, silyl or a polymer, wherein if $R^1$ and $R^2$ are alkyl, the alkyl may be linked to a further chelatoborate residue, and wherein
$Y^1$ and $Y^2$ together are a single oxygen atom, m=1, n=0, and wherein $Y^3$ and $Y^4$ are, independently of one another, H or an alkyl residue with 1 to 5 C atoms.

* * * * *